Oct. 5, 1954        H. SCHOTTLER        2,690,683

BALL BEARING SCREW

Filed Feb. 26, 1953        5 Sheets-Sheet 1

INVENTOR
HENRY SCHOTTLER
BY

INVENTOR
HENRY SCHOTTLER
BY

Oct. 5, 1954       H. SCHOTTLER       2,690,683
BALL BEARING SCREW
Filed Feb. 26, 1953       5 Sheets-Sheet 3
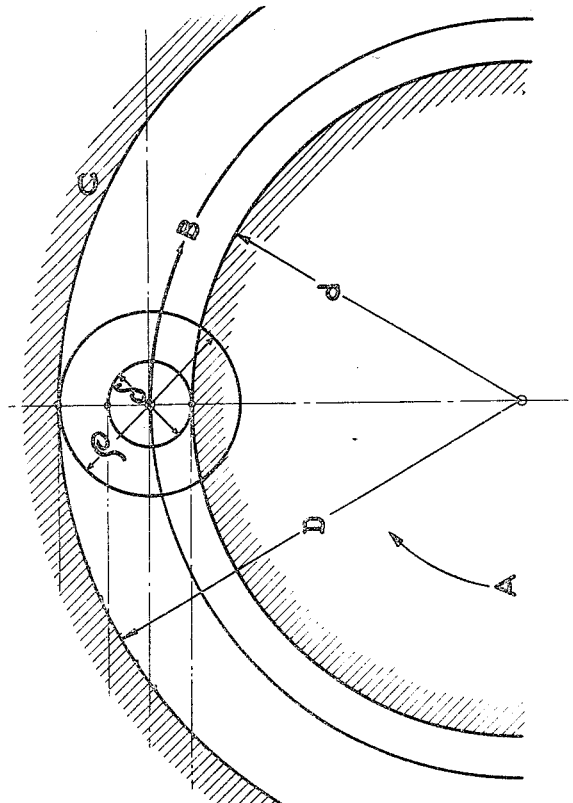
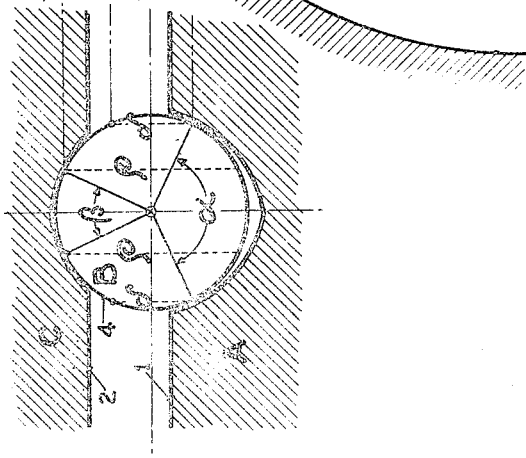
INVENTOR
HENRY SCHOTTLER
BY

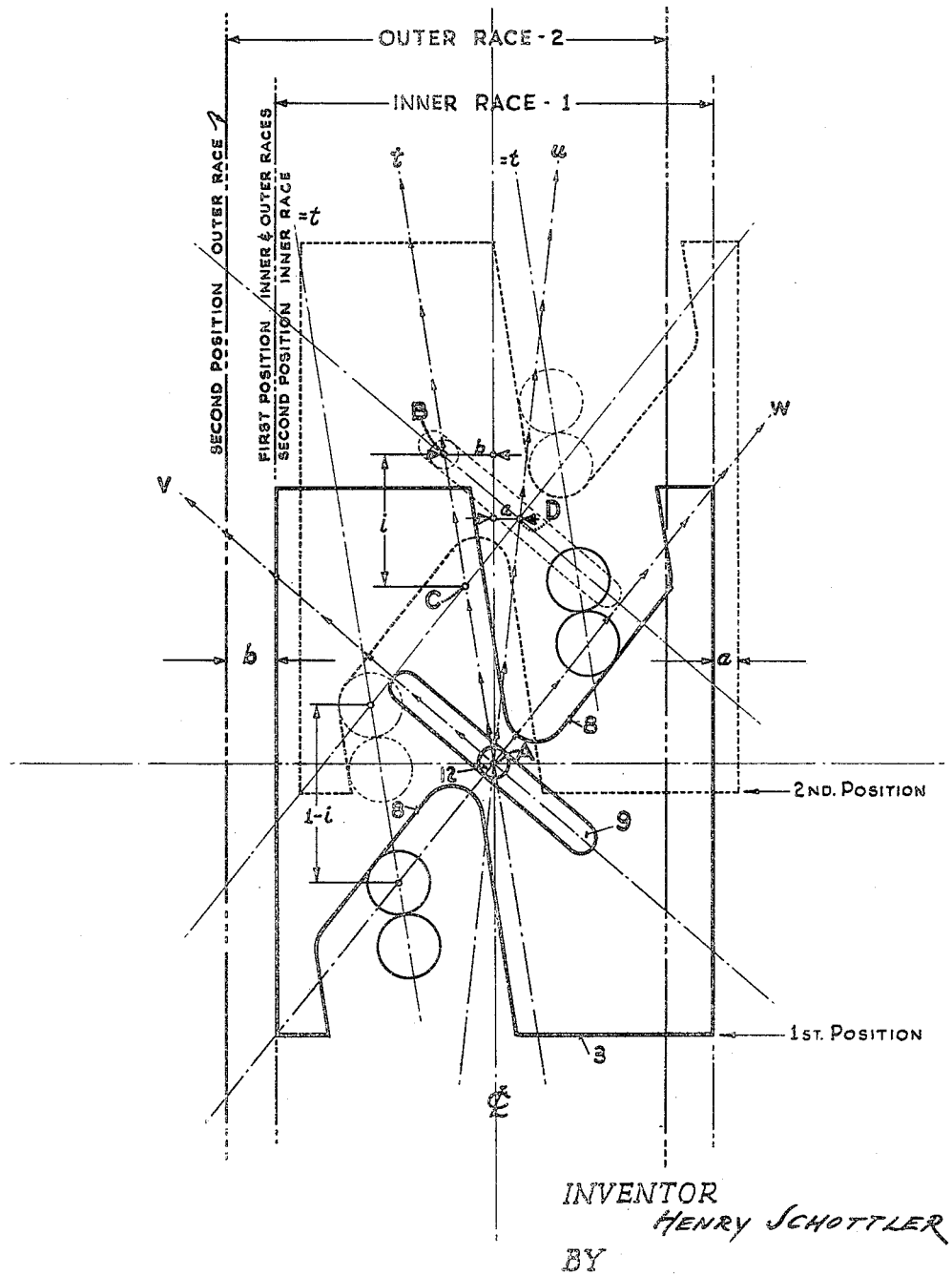

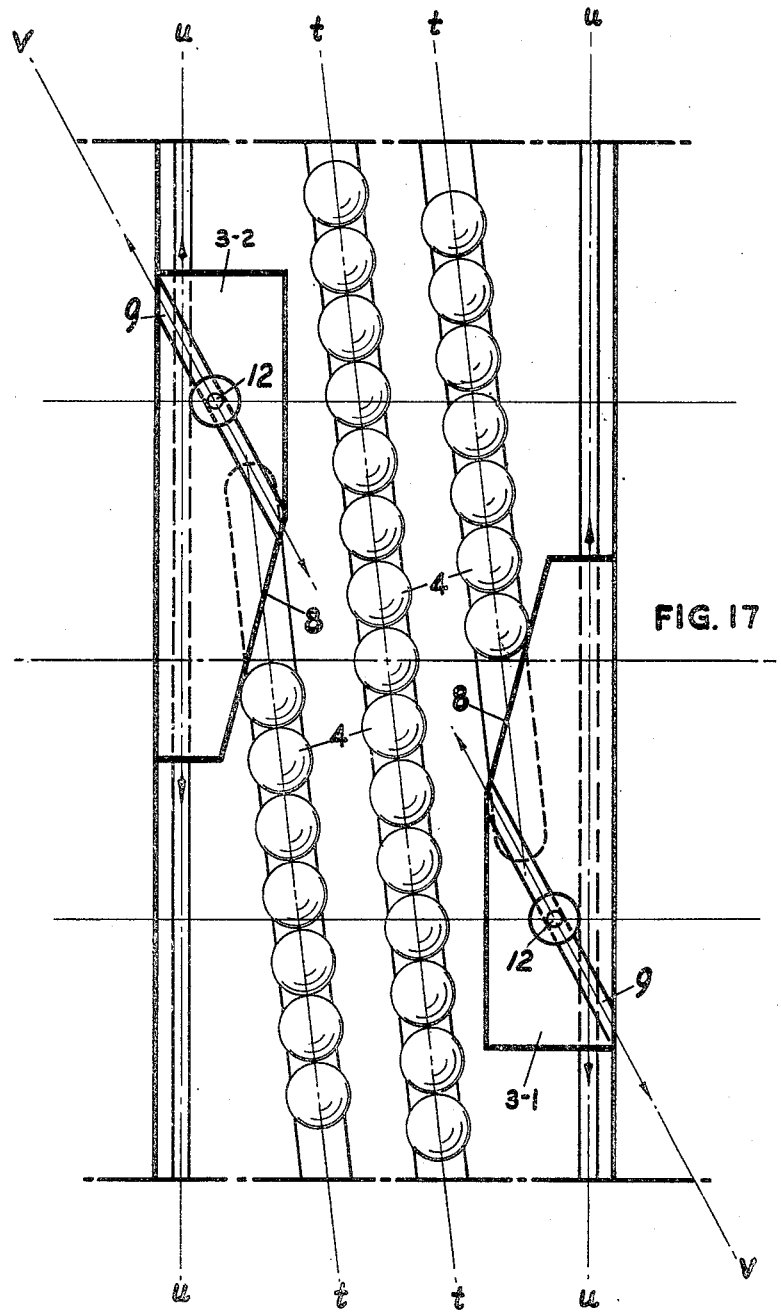

Patented Oct. 5, 1954

2,690,683

UNITED STATES PATENT OFFICE 2,690,683

BALL BEARING SCREW

Henry Schottler, New Orleans, La., assignor, by mesne assignments, to Roller Gear Company, Inc., a corporation of New York Application February 26, 1953, Serial No. 339,015

9 Claims. (Cl. 74—459)

This invention relates to a ball bearing screw device which is particularly adapted for use as a thrust loading device for friction gears but has many other applications, for instance in load moving devices, steering gear, and the like.

It is known in such gears to replace the conventional return passage for the balls by a cage which has the function to retain the balls in their helical raceway.

It is one of the objects of the invention to provide a ball bearing screw device in which the retaining cage is at all times so guided as to prevent the ball bearings from wedging or jamming during the operation of the device.

It is another object of the invention to provide a device of the character described which requires a minimum of space.

A further object of the invention is the provision of a retaining cage and guiding means therefor in which simplified design reduces material and production cost to a minimum and in which the hazards of wear are essentially eliminated.

These objects are accomplished by providing means which directly engage the retaining member or cage with the screw and nut members of the device and positively guide said cage so that the not operatively engaged balls are held in the respective positions which are required for their slipless rolling movement when in frictional engagement with said screw and nut.

Further objects and advantages of the invention will be apparent from the following description with reference to the accompanying drawings, wherein preferred embodiments of the invention are shown by way of example.

In the drawings:

Fig. 11 is a view similar to Fig. 9, illustrating an unsymmetrical ball thread;

Fig. 12 is a geometrical diagram;

Fig. 16 is a developed view of a retaining cage, showing the geometrical diagrams of its movement from a starting position to an intermediary position and a mode of determining the angular direction of the guiding slot with respect to the helix of the ball thread.

Fig. 17 is similar to Fig. 15 and shows a modification suitable for retaining the balls in a plurality of convolutions of a screw thread.

Figure 1:
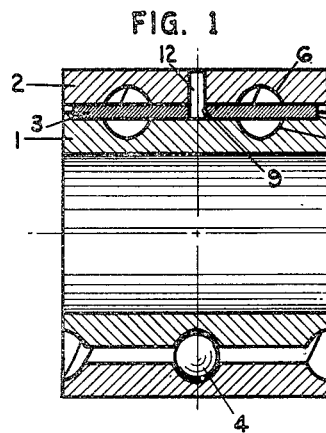
Fig. 1 is an axial section showing a ball bearing screw device according to the invention, with the retaining cage and guiding means therefor.
Figure 2:
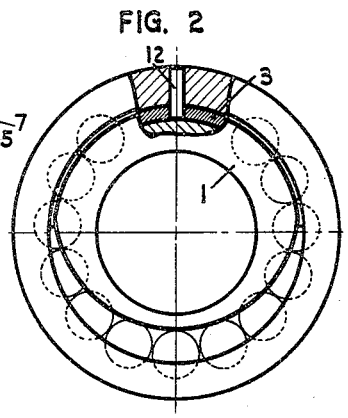
Fig. 2 is an axial view and part section of the device of Fig. 1.

Referring to Figs. 1–9 of the drawings, a semi-annular cage 3 is arranged between the worm or inner race 1 and the nut or outer race 2 in such a manner that it is held against axial movement with respect to the worm 1 by the flanges 7 of the worm 1 and is only free for rotational movement with respect to said worm. A guide pin 12 affixed to the nut or outer race 2 engages a slot 9 of the cage, whereby relative rotation between said cage and said nut results in axial displacement of the cage with respect to said nut.

The worm 1 and nut 2 are provided with complementary threads and fitted with balls 4 which are free to roll in the helix provided by said threads. In this way, thrust is transmitted from the worm member 1 of the mechanism to the nut member 2, or vice versa.

The pitch of the ball bearing helix, and the pitch of the guiding slot 9 and the angle of the guiding edges 8 must be so related as to prevent jamming and to allow the free planetary rolling movement of the balls 4 as determined by their contact points against the threads 5 and 6.

Referring to these Figs. 1–9, the cage is shown as positively guiding in the respective direction of rotation, only the first ball of a train of balls 4; therefore, it is not necessary to design the retaining cage as a full guiding ring or sleeve, but it is sufficient to employ a circularly curved plate extending only over a part of the periphery of the inner ball race 1. This renders the manufacture of the cage particularly simple and economic as it is readily stamped from sheet iron. The manufacture of the inner race 1 and the outer race 2 is also very simple, as it is only necessary to provide for the two flanges 7 on the race 1 and for a bore 11 in the race 2 to receive the pin 12, without additional machining. The device requires no additional space for the guiding of the balls and offers for many applications an excellent solution of the problem to provide a reliable guide for the balls in a limited space.

Figure 10:
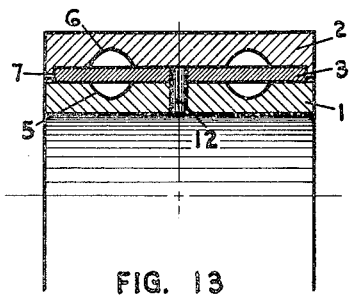
Fig. 10 is a view similar to Fig. 1, showing another arrangement of the cage guiding means.

The characteristic feature of the invention is that the cage is positively guided by direct and separate engagement with both race members of the device. In this way, the load transmitting balls 4 are relieved of any guiding function for the cage, and the separate guiding tracks formed, for instance, by the contact edges between the cage 3 and the flanges 7 on the one hand and by the slot 9 and pin 12 on the other hand, prevent any wedging or jamming as easily produced when both guiding directions are indirectly transmitted to the cage by a single movable member actuated by the coaction of the two race members. However, as long as the direct and separate guiding engagement between the cage and the race members is maintained, it is immaterial in which manner the separate guiding engagement is distributed between the two races. Fig. 10 shows an embodiment of the invention where, contrary to Fig. 1, the guiding flanges 7 are provided at the outer race member 2 and the pin 12 is affixed to the inner race member 1.

Figures 7, 8:
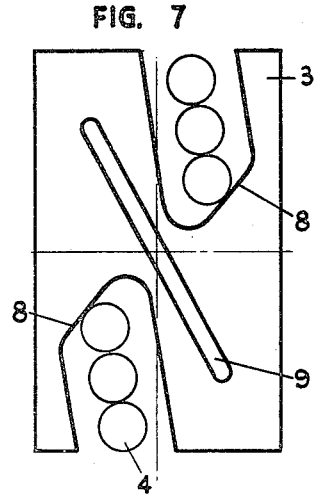
Fig. 7 is a developed view of the retaining cage.
Fig. 8 is a side view of Fig. 7.
Figure 13:
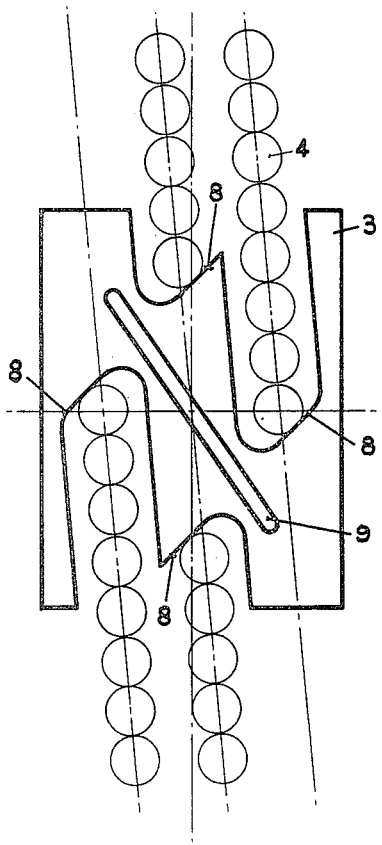
Fig. 13 is the development of a retaining cage for two ball threads.

Fig. 7 shows a cage 3 for the balls of a single screw thread, where the rolling movement of the balls corresponds to approximately half of the circumferential displacement of the one race with respect to the other race (as well illustrated, for instance, in Fig. 8 of Patent No. 1,775,479 to Jakob Arter). Fig. 13 shows a similar cage for two adjacent screw threads.

Figure 14:
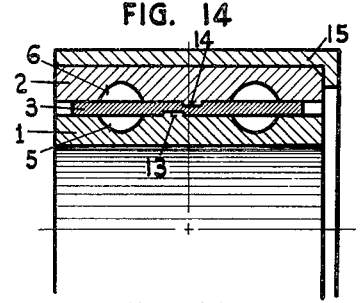
Fig. 14 is similar to Figs. 1 and 10, showing still another form of guiding means for the retaining cage.
Figure 15:
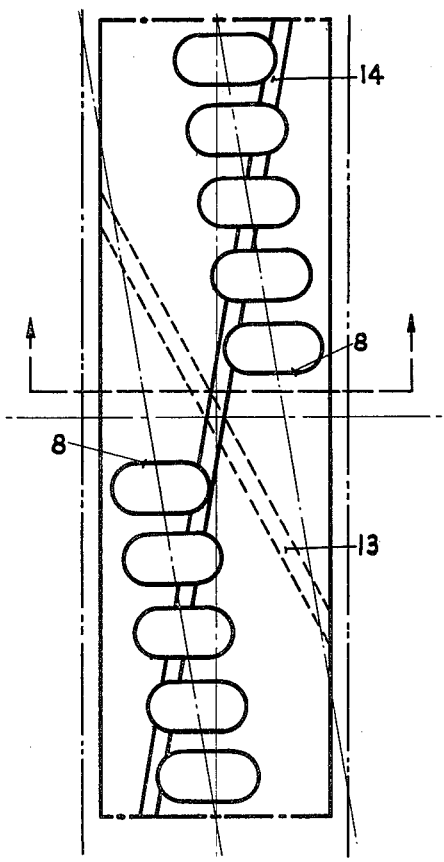
Fig. 15 is a development of the cage of Fig. 14.

Another form of a guiding arrangement for the cage 3 is illustrated in Figs. 14 and 15. In this modification of the invention, screw threads 13 and 14 are provided on the inner race 1 and the outer race 2, respectively, which engage corresponding furrows of the cage 3. By suitable adjustment of the pitch of the screw threads 13 and 14 it is possible to arrange the guiding edges 8 of the cage 3 parallel to the axis of the device without producing jamming. In this construction, the cage 3 is shown as an annular sleeve provided with elongated slots for receiving the balls 4.

If a cage according to the invention is to be applied to multiple convolutions of a ball bearing thread, it is convenient to divide the cage 3 in two separate sections 3-1 and 3-2, as illustrated in Fig. 17. In this case, it is necessary to provide also for each of the sections separate guiding means, as shown at $u$ for thread-like groove and rib engagements of the two sections with the one race and separate pins 12 and slot 9 connections in direction $v$ for engagement of the two sections with the other race.

It should be noted that quite generally the guiding action of the inner and outer race on the ball retaining member may be defined as effected by a direct screw-threaded engagement of said races with said member, whereby in the modification shown in Figs. 1–10 the screw thread between one of the races and the retaining member as defined by the flanges 7 has the pitch=0.

As the cage is prevented from axial movement with respect to one of the race members, the ball retaining helical slot 16 in the cage 3 of Fig. 7 and the longitudinal slots 17 of Fig. 15 must offer sufficient axial space for the relative axial displacement of the balls and cage during the rotary movement of said cage so as to prevent wedging of the balls.

The assemblage of a device according to Fig. 14 may be carried out by making the outer race 2 in two half-sections which are pressed together by an outer sleeve 15.

Normally the grooves of the thread in the inner and outer race will be symmetrical. In this case, the translation ratio of the movement of the balls to the inner or outer race determines the angle of the guiding edge 8 of the cage 3.

Figure 9:
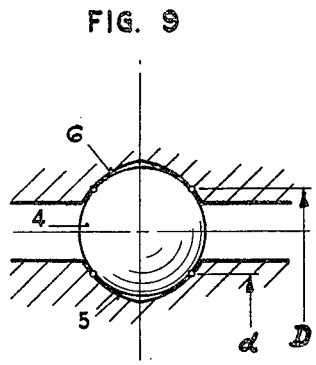
Fig. 9 is, on an enlarged scale, a section through part of the ball thread.
Figure 3:
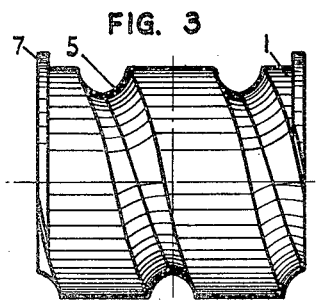
Fig. 3 is a side view showing the inner screw member of Fig. 1.
Figure 5:
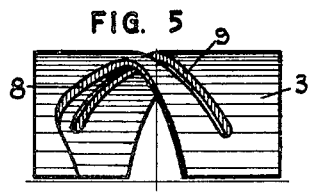
Fig. 5 is a side view of the retaining cage.
Figure 6:
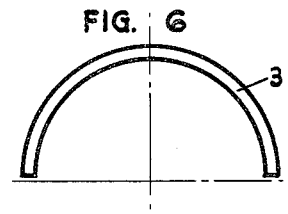
Fig. 6 is a view of the retaining cage taken in axial direction.
Figure 4:
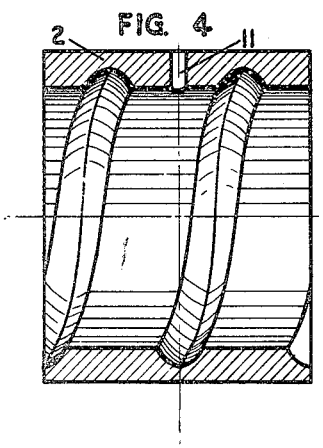
Fig. 4 is an axial section of the nut member of Fig. 1.

If it is desired to have guiding edges 8 which are parallel to the axis, without, however, employing the somewhat complicated construction of Fig. 14, this can be accomplished by providing not symmetrical helical grooves 5 and 6 as in Fig. 9 but grooves of the character shown in Figs. 11 and 12. In this way, it is possible to adjust the ratio of the ball movement to the movement of the races within wide limits. This will be readily understood on inspection of the following equation describing this relationship:

(1)
$$i = \frac{\text{Angular displacement of the balls}}{\text{Angular displacement of the inner race}} = \frac{d \cdot \rho}{d \cdot \rho + D \cdot \delta}$$

wherein $i$=transmission ratio
$d$=rolling diameter of the inner race
$D$=rolling diameter of the outer race
$\delta$=diameter of the balls in contact with their helical grooves in the inner race, and
$\rho$=diameter of the balls in contact with their helical grooves in the outer race.

In the embodiment of Fig. 9, the diameters $\delta$ and $\rho$ are equal, in which case the above equation is simplified to (1a) $$i = \frac{d}{d+D}$$

Fig. 16 illustrates diagrammatically the relative movements of the members of the device and the angular relationship between the pitch of the ball bearing thread, the cage guiding threads and the guiding edges of the cage.

If the inner race 1 is held in fixed position and the outer race 2 is turned, the pin 12 fixedly secured to said outer race 2 travels in the direction $t$ (=pitch of the ball thread) from point A to point B. The cage 3 is in thread-like engagement with the inner race 1 and is displaced in the direction $u$ into the position shown in dotted lines. At the same time, the pin 12 travels in the guiding slot 9, which has the direction $v$, from D to B. The balls roll in their helical track the distance A—C in the direction $t$.

Suitable values of the inclination $v$ of the guiding slot 9 and of the guiding edges 8 can be graphically determined from Fig. 16. It is to be assumed that the pitch $t$ of the ball thread is known, and that the degree to which the ball bearing nut is allowed to travel is determined by the point B; the form of the thread grooves 5 and 6 (Fig. 9) defines the value $i$ of the translation ratio, i. e. the point C. It may be further assumed that the pitch $u$ has been selected for the thread-like engagement of the cage with the inner race 1. The angle of the guiding edge 8 is given by the line $w$.

From these given or chosen values, the most suitable direction of the slot 9 is determined as follows: A line is drawn through C parallel to $w$, which intersects the line $u$ in point D. The line D—B determines then the direction of the line $u$, i. e. the inclination of the slot 9.

Conversely, it is of course possible to choose a value for the inclination $v$ and to determine therefrom the inclination of the guiding edges 8. In doing so, some other point D is obtained, and the connection C—D determines the direction of the guiding edge 8.

In this way, the inclination of the guiding edge 8 or of the guiding slot 9 can be readily determined after the one value has been chosen in accordance with the most suitable conditions for the manufacture of the cage. The determination of these values can, of course, also be done mathematically.

The pitch $v$ of the screw thread engagement between cage 3 and the outer race 2 can be defined by the equation (2)
$$v = \frac{t \cdot \left(1 - \frac{u}{w}\right) + u \cdot (1-i) \cdot \left(1 + \frac{t}{w}\right)}{1 - \frac{u}{w} - (1-i) \cdot \left(1 + \frac{t}{w}\right)}$$

wherein $t$ = pitch of the helical ball thread
$u$ = pitch of the screw thread engagement of the cage with the inner race 1
$w$ = pitch of the leading edge 8 of the cage 3
$i$ = transmission ratio (see Equation 1).

In devices constructed according to Fig. 1, wherein $u = 0$, all factors of Equation 2 which contain $u$ are eliminated, leaving the equation (2a)
$$v = \frac{t}{1 - (1-i) \cdot \left(1 + \frac{t}{w}\right)}$$

It will be readily understood that many variations of constructional details are possible. For example, the grooves for the ball thread may have straight faces, when only light loads are to be transmitted, or the guiding threads for the cage may be transferred laterally to the one or to both sides of the ball-bearing threads. Either the inner or the outer race may constitute the driving or the driven member. While the embodiments of the invention as herein disclosed constitute preferred forms, it is intended that they shall be interpreted as illustrative and not in a limiting sense.

What I claim is:

1. In a ball bearing screw, an inner member having a helical thread, an outer member surrounding said inner member and having a complementary helical thread, said members being axially displaceable and rotatable with respect to each other, said threads forming a helical path, balls in said path for transmitting thrust from the one to the other of said members, a retaining cage for said balls arranged between said inner and said outer member, means positively and directly interengaging said cage with said inner and said outer member for helical movement corresponding to the rolling movement imparted by the displacement of one of said members to the balls, means in said cage to hold the not operatively engaged balls in the helical path in their respective positions required for their slipless rolling movement in frictional engagement with the inner and outer member, and openings in said cage allowing free rotation of said balls and axial displacement of the cage with respect to said balls.

2. In a ball bearing screw, an inner member having a helical thread, an outer member surrounding said inner member and having a complementary helical thread, said members being axially displaceable and rotatable with respect to each other, said threads forming a helical path, a train of balls in said path for transmitting thrust from the one to the other of said members, a retaining cage in the form of a circularly bent plate arranged between said inner and said outer member and enveloping part of the circumference of said inner member, at least one first helical slot in said cage in the direction of said helical path allowing free rotation of said balls and axial displacement of the cage with respect to said balls, the front and rear edge of said slot being arranged for guiding the not operatively engaged balls in the helical path into their respective positions required for their slipless rolling movement in frictional engagement with the inner and outer member, one of said members having an integrally formed pair of flanges holding said cage against axial displacement with respect to said member, and the other of said members having a pin engaging a second helical slot in said cage for guiding the cage in a helical movement corresponding to the rolling movement imparted to the balls by the displacement of one of said members.

3. In a ball bearing screw, an inner member having a helical thread, an outer member surrounding said inner member and having a complementary helical thread, said members being axially displaceable and rotatable with respect to each other, said threads forming a helical path, balls in said path for transmitting thrust from the one to the other of said members, a retaining cage in the form of a circularly bent plate arranged between said inner and said outer member and enveloping part of the circumference of said inner member, a plurality of longitudinal perforations in said cage provided in the direction of said helical path allowing free rotation of said balls and axial displacement of the cage with respect to said balls, the longitudinal edges of said perforations having an inclination suitable for holding the not operatively engaged balls in the helical path in their respective positions required for their slipless rolling movement in frictional engagement with the inner and outer member, one of said members having an integrally formed pair of flanges holding said cage against axial displacement with respect to said member, and the other of said members having a pin engaging a helical slot in said cage for guiding the cage in a helical movement corresponding to the rolling movement imparted to the balls by the displacement of one of said members.

4. In a ball bearing screw, an inner member having a helical thread, an outer member surrounding said inner member and having a complementary helical thread, said members being axially displaceable and rotatable with respect to each other, said threads forming a helical path, balls in said path for transmitting thrust from the one to the other of said members, a retaining cage for said balls arranged between said inner and said outer member, screw thread-like connections positively and directly interengaging said cage with said inner and said outer member for helical movement corresponding to the rolling movement imparted by the displacement of one of said members to the balls, means in said cage to hold the not operatively engaged balls in the helical path in their respective positions required for their slipless rolling movement in frictional engagement with the inner and outer member, and openings in said cage allowing free rotation of said balls and axial displacement of the cage with respect to said balls.

5. A ball bearing screw as defined in claim 4 wherein said retaining cage is a tubular sleeve.

6. A ball bearing screw as defined in claim 4 wherein said retaining cage is a tubular sleeve, and wherein said openings are longitudinal slots arranged along the helical ball path and having longitudinal edges holding the not operatively engaged balls in their respective positions required for their slipless rolling movement.

7. A ball bearing screw as defined in claim 4 wherein said retaining cage is a circularly bent plate enveloping part of the circumference of the inner member and having at least one helical slot in the direction of the helical ball path allowing free rotation of said balls and axial displacement of the cage with respect to said balls.

8. A ball bearing screw as defined in claim 4 wherein said retaining cage is a circularly bent plate enveloping part of the circumference of the inner member and having a plurality of longitudinal slots arranged along the helical ball path and having longitudinal edges holding the not operatively engaged balls in their respective positions required for their slipless rolling movement.

9. In a ball bearing screw, an inner member having a helical thread, an outer member surrounding said inner member and having a complementary helical thread, said members being axially displaceable and rotatable with respect to each other, said threads forming a helical path, a train of balls extending over a plurality of convolutions in said path for transmitting thrust from the one to the other of said members, a ball-retaining member at each end of said train of balls, said retaining members being arranged between said threaded inner and said threaded outer member and enveloping part of the circumference of said threaded inner member, edges on these retaining members confining the not operatively engaged balls in the helical path in their respective positions required for their slipless rolling movement in frictional engagement with the inner and outer threaded members, parallel rib and groove connections interengaging said retaining members with one of said threaded members, a helical slot in each of said retaining members, said slots forming sections of a same interrupted helical track, and pins on the other of said threaded members engaging said slots for guiding the retaining members in a helical movement corresponding to the rolling movement imparted to the balls by the displacement of one of said threaded members.

References Cited in the file of this patent

FOREIGN PATENTS

| Number | Country | Date |
|--------|---------|------|
| 451,840 | Italy | Sept. 29, 1949 |
| 510,798 | Great Britain | Aug. 8, 1939 |